(12) United States Patent
Cheng

(10) Patent No.: US 8,295,051 B2
(45) Date of Patent: Oct. 23, 2012

(54) COMPUTER SYSTEM WITH BACKPLANE

(75) Inventor: Hao-Der Cheng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 41 days.

(21) Appl. No.: 12/791,033

(22) Filed: Jun. 1, 2010

(65) Prior Publication Data

US 2011/0235262 A1    Sep. 29, 2011

(30) Foreign Application Priority Data

Mar. 29, 2010   (CN) .......................... 2010 1 0134081

(51) Int. Cl.
*G06F 1/16*       (2006.01)
*H05K 5/00*      (2006.01)
*H05K 7/00*      (2006.01)

(52) U.S. Cl. ............... 361/727; 361/679.46; 361/679.48

(58) Field of Classification Search .......... 361/724–727, 361/679.46–679.5
See application file for complete search history.

(56) References Cited

U.S. PATENT DOCUMENTS

| | | | | |
|---|---|---|---|---|
| 5,596,483 A * | 1/1997 | Wyler | | 361/679.47 |
| 5,963,431 A * | 10/1999 | Stancil | | 361/803 |
| 6,049,449 A * | 4/2000 | Cranston et al. | | 361/679.58 |
| 6,437,980 B1 * | 8/2002 | Casebolt | | 361/679.54 |
| 6,504,718 B2 * | 1/2003 | Wu | | 361/695 |
| 6,542,362 B2 * | 4/2003 | Lajara et al. | | 361/679.48 |
| 6,795,314 B1 * | 9/2004 | Arbogast et al. | | 361/695 |
| 6,816,368 B2 * | 11/2004 | Yokosawa | | 361/679.33 |
| 6,906,914 B2 * | 6/2005 | Stamos et al. | | 361/679.31 |
| 7,068,509 B2 * | 6/2006 | Bash et al. | | 361/700 |
| 7,177,145 B2 * | 2/2007 | Carlson et al. | | 361/679.32 |
| 7,453,707 B2 * | 11/2008 | Beall et al. | | 361/796 |
| 7,535,707 B2 * | 5/2009 | Seibold | | 361/679.49 |
| 7,710,731 B2 * | 5/2010 | McClure et al. | | 361/727 |
| 7,782,630 B2 * | 8/2010 | Kajio et al. | | 361/788 |
| 7,894,208 B1 * | 2/2011 | Lin | | 361/796 |
| 2005/0168938 A1 * | 8/2005 | Bash et al. | | 361/687 |
| 2005/0207134 A1 * | 9/2005 | Belady et al. | | 361/796 |
| 2006/0065721 A1 * | 3/2006 | Addison et al. | | 235/383 |
| 2007/0223200 A1 * | 9/2007 | Fujiya et al. | | 361/727 |
| 2008/0043405 A1 * | 2/2008 | Lee et al. | | 361/600 |
| 2008/0046617 A1 * | 2/2008 | Lee et al. | | 710/104 |
| 2008/0285221 A1 * | 11/2008 | Imsand et al. | | 361/681 |
| 2009/0016037 A1 * | 1/2009 | Chen et al. | | 361/810 |
| 2009/0097200 A1 * | 4/2009 | Sharma et al. | | 361/688 |
| 2009/0195978 A1 * | 8/2009 | Hu et al. | | 361/679.48 |
| 2010/0270897 A1 * | 10/2010 | Lin | | 312/223.2 |
| 2010/0271766 A1 * | 10/2010 | Lin | | 361/679.02 |

* cited by examiner

*Primary Examiner* — Adrian S. Wilson

(74) *Attorney, Agent, or Firm* — Altis Law Group, Inc.

(57) ABSTRACT

A computer system includes a chassis, a motherboard, a backplane, riser cards, and disk drives. The chassis includes a bottom wall. The motherboard is secured to and parallel to the bottom wall. The backplane is secured to the bottom wall, and electrically connected to and parallel to the motherboard. The riser cards are electrically and perpendicularly connected to the backplane. The disk drives are electrically connected to the riser cards.

7 Claims, 4 Drawing Sheets

COMPUTER SYSTEM WITH BACKPLANE

BACKGROUND

1. Technical Field

The present disclosure relates to a computer system with a backplane.

2. Description of Related Art

Riser cards are used in servers to electrically connect hard disk drives to a backplane, which is electrically connected to a motherboard. A server includes a chassis. The chassis includes a bottom wall and two parallel sidewalls perpendicular to the bottom wall. The motherboard is secured to and parallel to the bottom wall, and the backplane is perpendicular to the bottom wall and the sidewalls. Airflow flows in a direction from the hard disk drive, and the direction is perpendicular to the backplane. At lease some airflow is blocked by the backplane affecting heat dissipation efficiency of the server.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
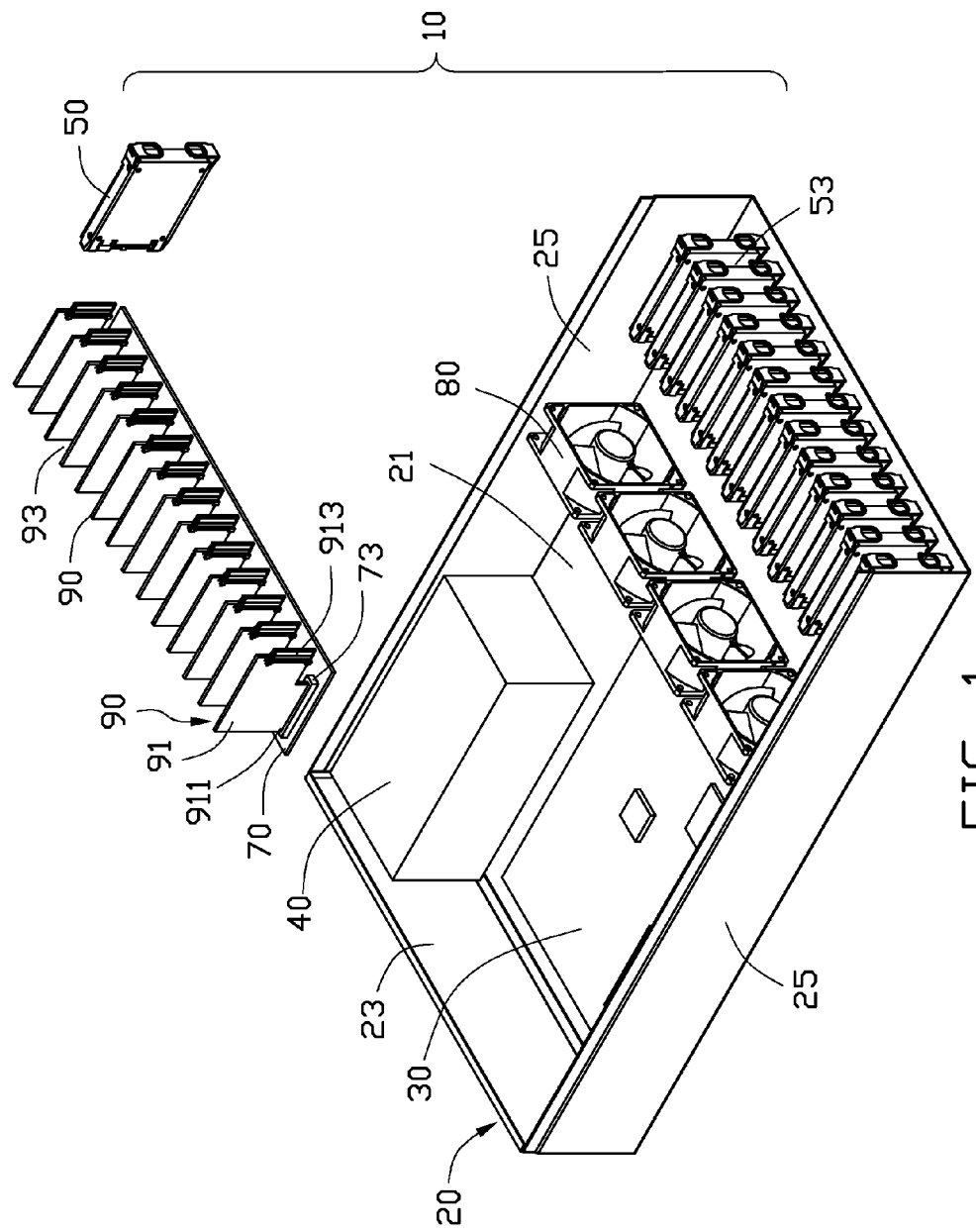
FIG. 1 is a partially exploded view of a computer system in accordance with an embodiment.

Referring to FIG. 1, a computer system 10 in accordance with an embodiment includes a chassis 20, a backplane 70, a plurality of riser cards 90, and a plurality of disk drives 50.

The chassis 20 includes a bottom wall 21, a rear wall 23, and two sidewalls 25. The rear wall 23 and the sidewalls 25 are located on three adjacent sides of the bottom wall 21. In an embodiment, the rear wall 23 and the two sidewalls 25 are substantially perpendicular to the bottom wall 21, and the rear wall 23 is substantially perpendicular to the two sidewalls 25. A motherboard 30 is secured to the bottom wall 21 adjacent the rear wall 23 and is parallel to the bottom wall 21. A power supply 40 is secured to the rear wall 23 at one side of the motherboard 30. A plurality of fans 80 is secured to the bottom wall 21 at a front side of the motherboard 30.

The backplane 70 is capable of electronically connecting with the motherboard 30. A plurality of backplane connectors 73 is located on the backplane 70.

Figure 2:
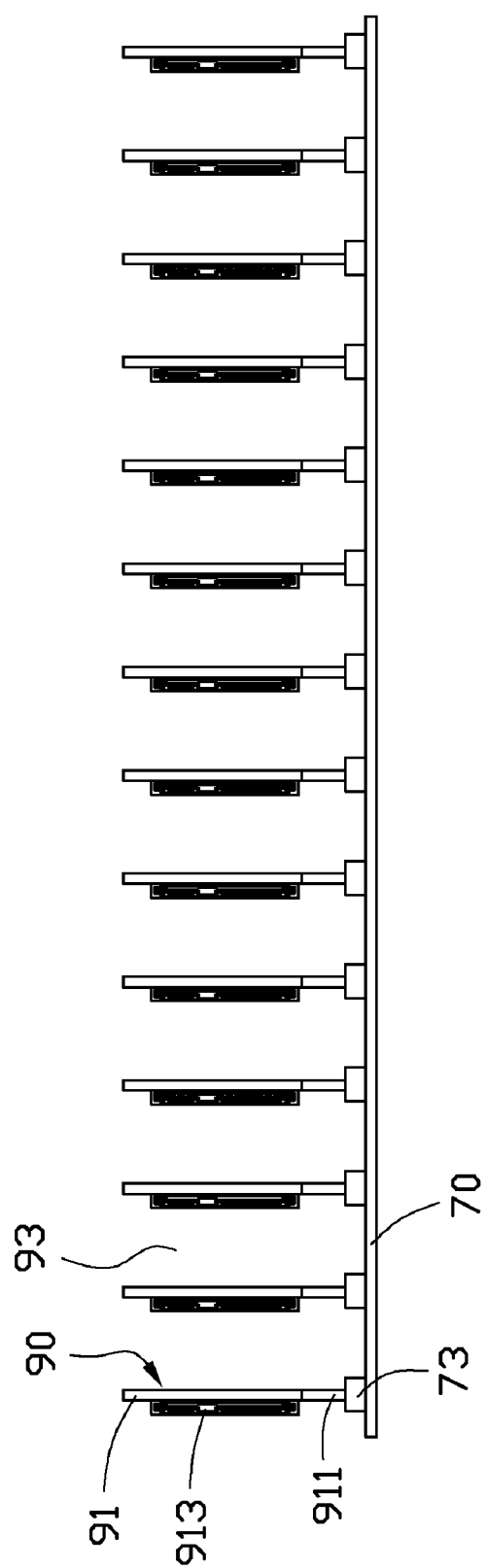
FIG. 2 is a front view of a backplane and a plurality of riser cards of FIG. 1.

Referring to FIG. 2, the riser cards 90 are capable of engaging in the backplane connectors 73. Each riser card 90 includes a card body 91. The card body 91 includes a bottom edge and a front edge substantially perpendicular to the bottom edge. A connecting portion 911 extends from the bottom edge of each riser card 90 and is configured to electrically engaging in one of the backplane connectors 73. A riser card connector 913 is located on the front edge of each riser card 90. When the riser cards 90 are secured to the backplane 70, the riser cards 90 are parallel to each other and perpendicular to the backplane 70. A gap 93 is defined between each two adjacent riser cards 90.

Each of the disk drives 50 includes a disk drive connector 51 at a rear side. The disk drive connectors 51 is capable of electrically engaging with the riser card connectors 913.

Figure 3:
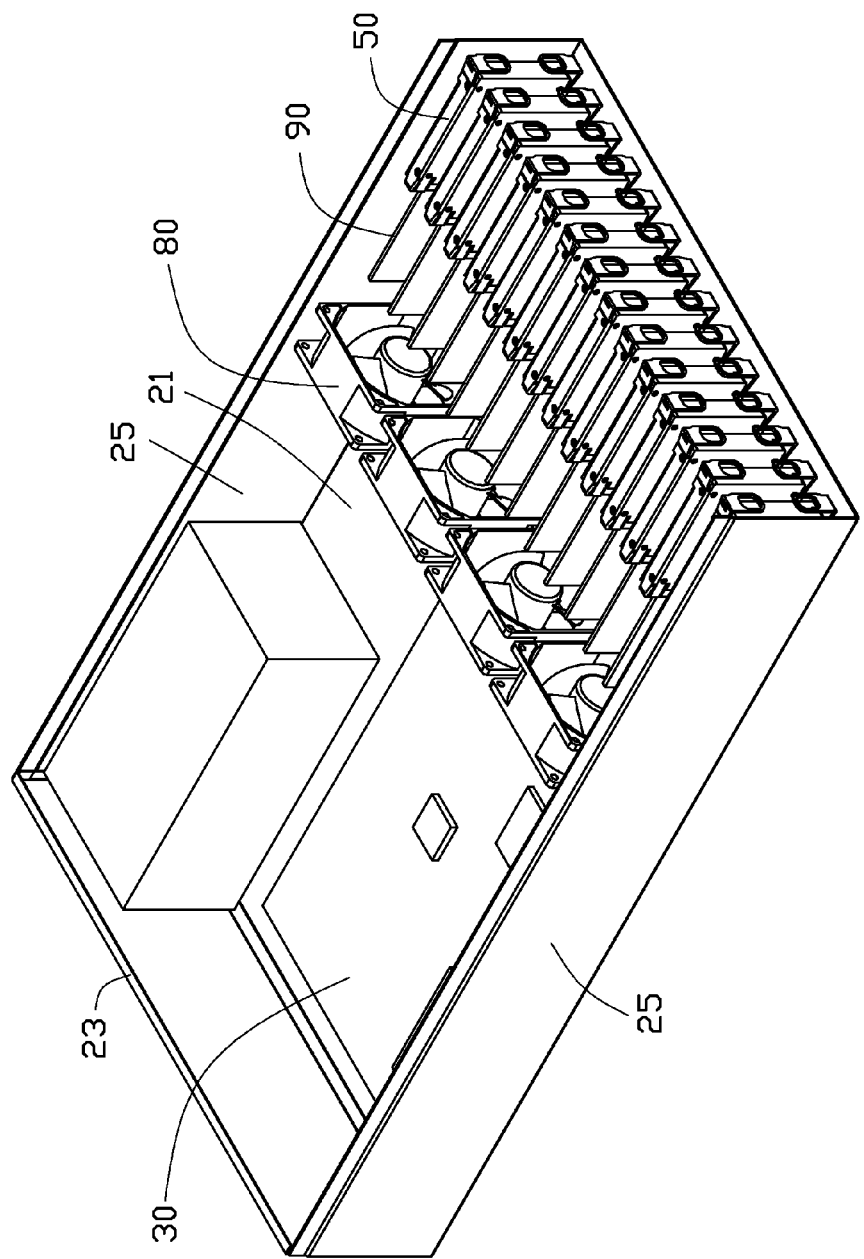
FIG. 3 is an assembled view of the computer system of FIG. 1.
Figure 4:
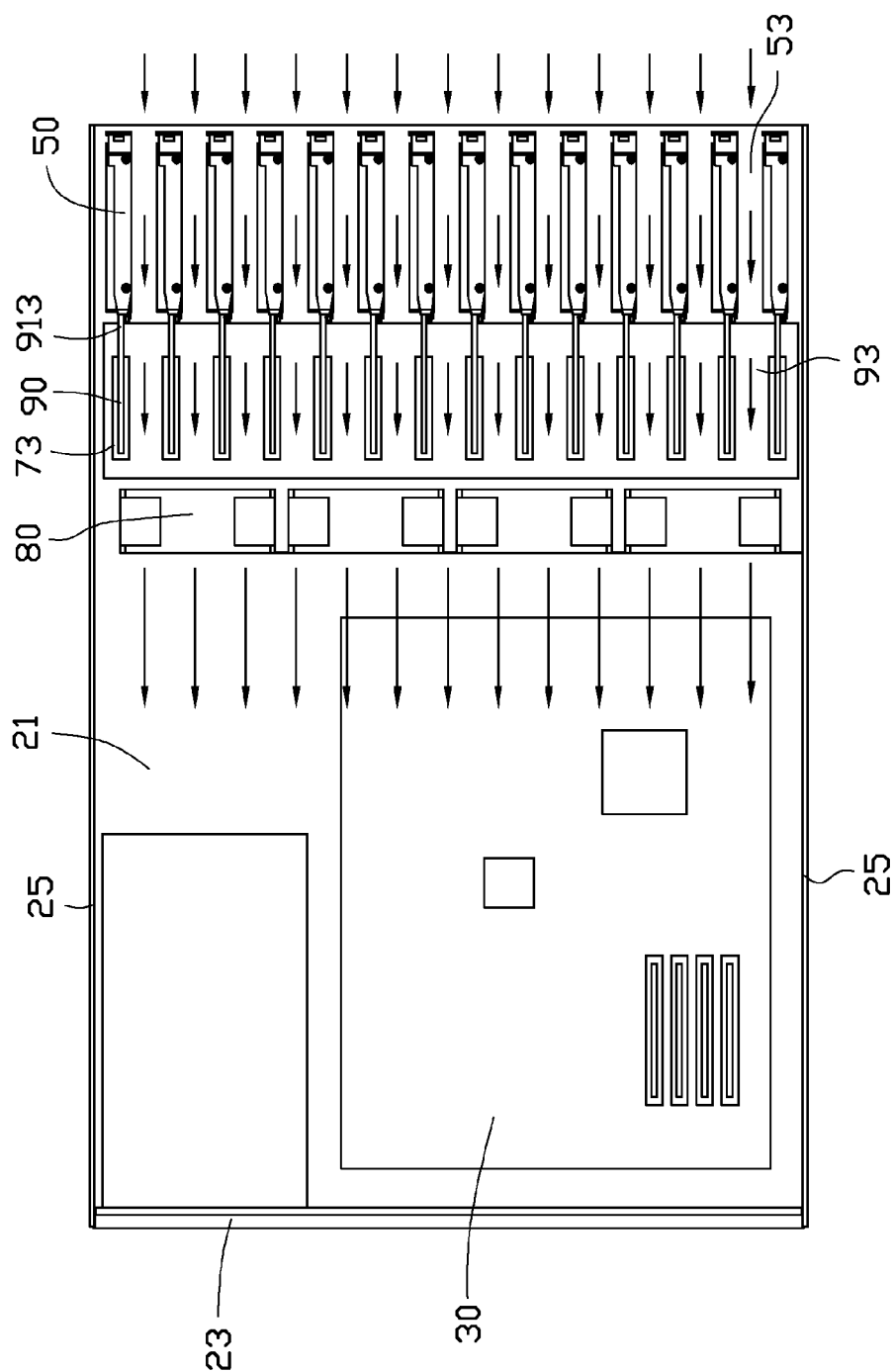
FIG. 4 is a top view of the computer system of FIG. 3.

Referring to FIGS. 3-4, the backplane 70 is secured to the bottom wall 21 in a front side of the fans 80 and electrically connected to the motherboard 30. The riser cards 90 are located on and perpendicular to the backplane 70. The disk drives 50 are inserted into the chassis 20 at a front side of the backplane 70, and the disk drive connectors 51 are electronically connected to the riser card connectors 913. A space 53 is defined between each two adjacent disk drives 50. The riser cards 90 are parallel to the sidewalls 25.

In use, the fans 80 draws air along a direction in the chassis 20 from front to back (arrow shown in FIG. 4). The direction is perpendicular to the rear wall 23. The airflow flows through the spaces 53 and the gaps 93, passes through the fans 80, and flows to the motherboard 30. Because the backplane 70 is parallel to the bottom wall 21, the direction of airflow is parallel to the backplane 70. Therefore, the airflow cannot be blocked by the backplane 70, thus increasing heat dissipation efficiency of the computer system 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
    a chassis comprising a bottom wall;
    a motherboard secured to and parallel to the bottom wall, the bottom wall supports the motherboard thereon;
    a backplane secured to the bottom wall, the backplane is electrically connected to and parallel to the motherboard;
    a plurality of riser cards electrically connected to and perpendicular to the backplane;
    a plurality of disk drives electrically connected to the plurality of riser cards; and
    a plurality of fans located on the bottom wall,
    wherein the plurality of riser cards is located between the plurality of fans and the plurality of disk drives, and an airflow path extends through the motherboard, the plurality of fans, the riser cards and the plurality of disk drives sequentially along a straight direction; and the plurality of fans is secured to the bottom wall, between the motherboard and the backplane; the plurality of fans is located at a front side of the motherboard, the back plane and the plurality of riser cards is located in a front side of the plurality of fans, the plurality of fans separates the plurality of riser cards from the motherboard, and the motherboard and the plurality of riser cards are not overlapping in a vertical direction which is perpendicular to the straight direction.

2. The computer system of claim 1, wherein the backplane is located between each of the fans and each of the disk drives.

3. A computer system comprising:

a bottom wall;

a motherboard secured to and parallel to the bottom wall;

a backplane secured to the bottom wall, the backplane is electrically connected to and parallel to the motherboard;

a plurality of riser cards electrically connected to and perpendicular to the backplane; and a plurality of disk drives electrically connected to the plurality of riser cards;

a plurality of fans located on the bottom wall, wherein the plurality of riser cards is located between the plurality of fans and the plurality of disk drives, and an airflow path extends through the motherboard, the plurality of fans, the riser cards and the plurality of disk drives sequentially along a straight direction, and the plurality of disk drives is parallel to the plurality of riser cards; a plurality of backplane connectors is disposed on the backplane; each of the plurality of riser cards comprises a card body with a first edge and a second edge, the first edge is perpendicular to the second edge; and a connecting portion extends from the first edge of each riser card and electrically engages with one of the plurality of backplane connectors; and a riser card connector is located on the second edge of each riser card; and each disk drive comprises a disk drive connector electrically engaging with the riser card connector of one of plurality of the riser cards; the plurality of fans is located at a front side of the motherboard, the back plane and the plurality of riser cards is located in a front side of the plurality of fans, the plurality of fans separates the plurality of riser cards from the motherboard, and the motherboard and the plurality of riser cards are not overlapping in a vertical direction which is perpendicular to the straight direction.

4. The computer system of claim 3, wherein the riser card connector extends in the vertical direction, and the connecting portion extends in the straight direction.

5. A computer system comprising:

a bottom wall, the bottom wall comprising a first area, a second area, a third area, and a fourth area, the first area; the second area, the third area, and the fourth area are arranged along a straight direction on the bottom wall; and all of the first area, the second area, the third area, and the fourth area are separated and are not overlapping with each other;

a motherboard mounted on the first area and parallel to the bottom wall;

a backplane and a plurality of riser cards mounted on the third area, the backplane is parallel to the bottom wall, the backplane is electrically connected to and parallel to the motherboard, the plurality of riser cards is electrically connected to and perpendicular to the backplane;

a plurality of disk drives located on the fourth area and electrically connected to the plurality of riser cards, the plurality of disk drives is parallel to the plurality of riser cards;

a plurality of fans located on the second area;

wherein an airflow path extends through the motherboard, the plurality of fans, the plurality of riser cards, and the plurality of disk drives sequentially along the straight direction, and the motherboard and the plurality of riser cards are not overlapping in a vertical direction which is perpendicular to the straight direction.

6. The computer system of claim 5, wherein a plurality of backplane connectors is disposed on the backplane; each of the plurality of riser cards comprises a card body with a first edge and a second edge, the first edge is perpendicular to the second edge; and a connecting portion extends from the first edge of each of the plurality of riser cards and electrically engages with one of the plurality of backplane connectors; and a riser card connector is located on the second edge of each of the plurality of riser cards; and each of the plurality of disk drives comprises a disk drive connector electrically engaging with the riser card connector of corresponding one of the plurality of riser cards.

7. The computer system of claim 6, wherein the riser card connector extends in the vertical direction, and the connecting portion extends in the straight direction.

\* \* \* \* \*